Sept. 21, 1954     O. P. DE LOE     2,689,358
TRANSFER MECHANISM
Filed Feb. 13, 1951                        2 Sheets-Sheet 1
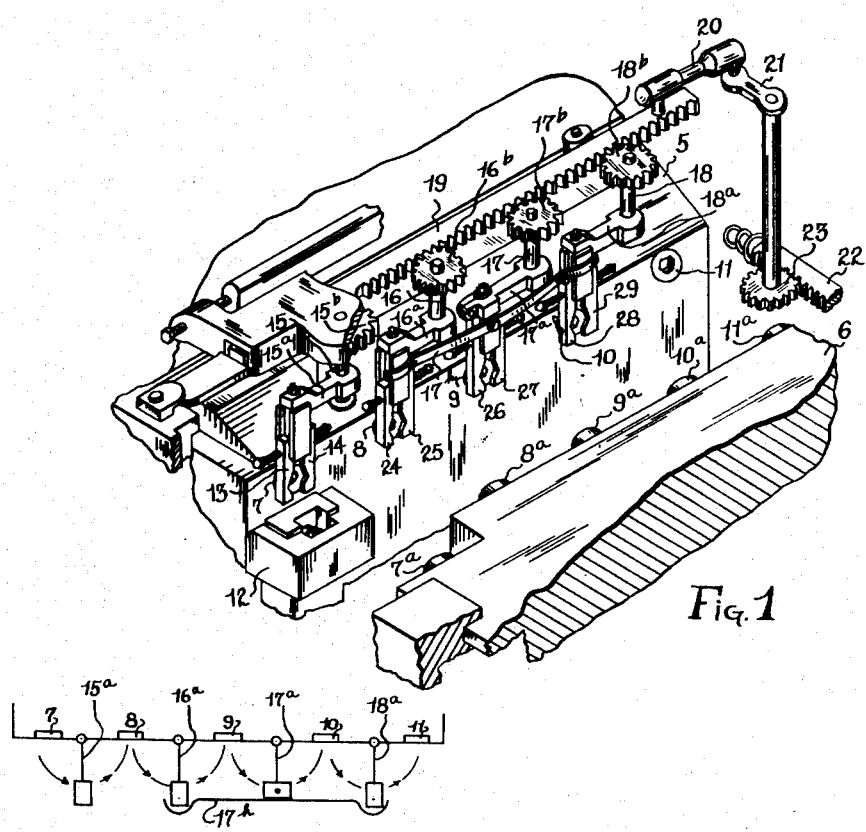
INVENTOR.
OLIVER PAUL DE LOE
BY
Richey & Watts
ATTORNEYS

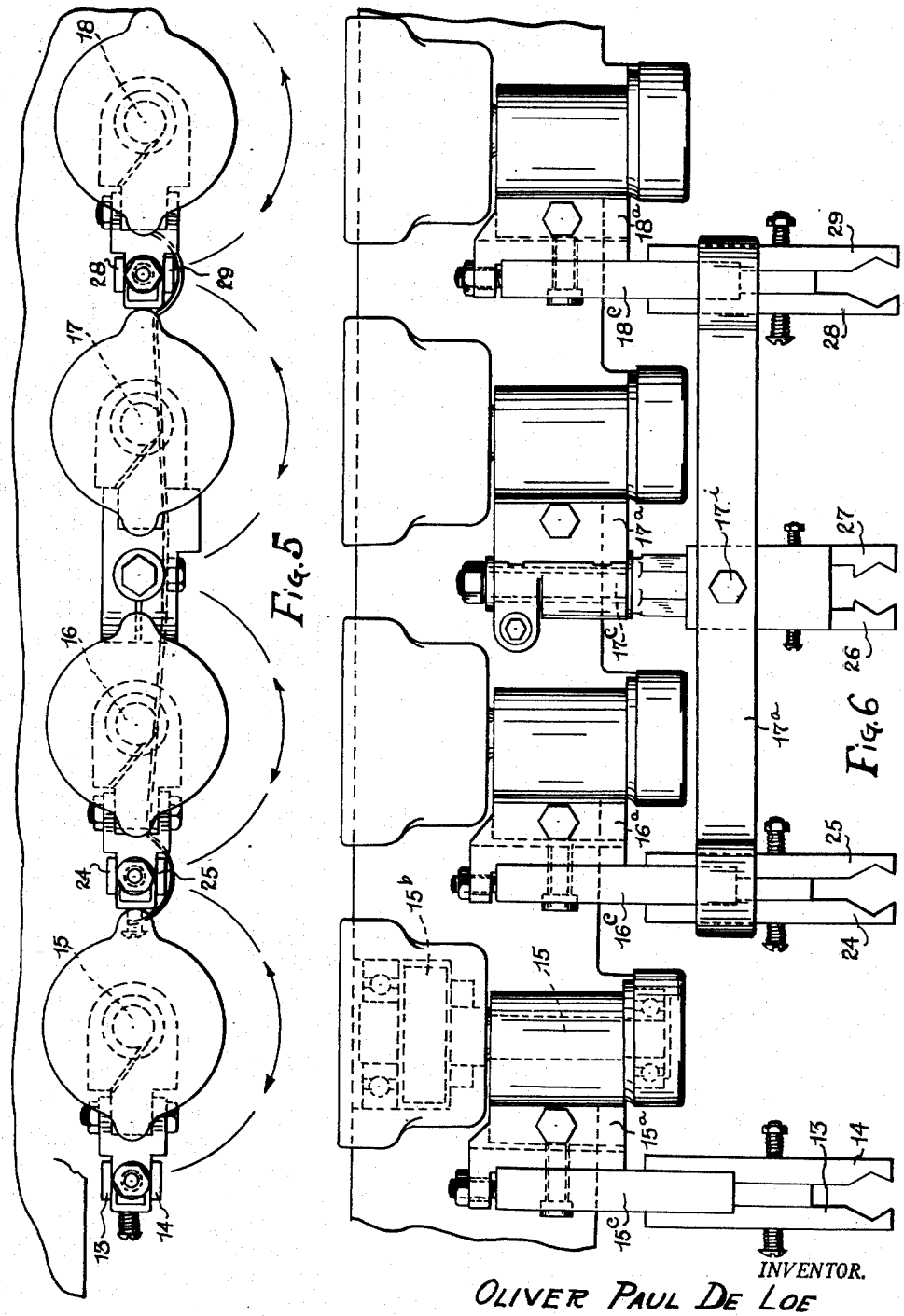

Patented Sept. 21, 1954

2,689,358

UNITED STATES PATENT OFFICE 2,689,358

TRANSFER MECHANISM

Oliver Paul De Loe, Detroit, Mich., assignor to The National Machinery Company, Tiffin, Ohio, a corporation of Ohio Application February 13, 1951, Serial No. 210,745

6 Claims. (Cl. 10—12)

1

This invention relates to machines for making metal articles such as nuts and more particularly to a transfer mechanism for such machines.

In the manufacture of articles such as bolts, nuts, and the like, a bed frame is provided with a series of dies, and a reciprocating header slide carrying tools in alignment with the dies cooperates with such dies to shape the article. The articles are advanced sequentially from one die to the next adjacent die by a transfer mechanism which moves in timed relation to the header slide movement. A type of transfer enjoying wide current use is that disclosed in the patent to Frayer No. 2,100,028 wherein a nut blank is moved from one die station to the next by an arm pivoted midway between the stations. When the header slide is moved away from the bed frame dies, the arm is swung 180 degrees and the fingers on the arm carrying the nut blank thus turn the blank 180 degrees between each station.

The inversion of the blank from one die station to the next is desirable in the manufacture of many types of conventional nuts. Frequently, however, it is necessary or desirable to perform successive operations by the header slide tools on the same face of the nut blank. This need was recognized by the said patentee Frayer and said patent discloses a straight line reciprocating transfer which may be used where the blank is to be transferred without turning same between stations.

The present invention is directed to a transfer mechanism wherein the blank is carried bodily through a semi-circular path from a first die station to a second die station with the same blank face disposed toward both dies. It is among the objects of my invention to provide a transfer mechanism that will carry a blank bodily from a first die station to a second die station through a semicircular path and at the same time preserve the axial disposition of the blank with respect to the dies. It is a further object of the invention to provide a transfer mechanism wherein the blanks are progressively moved through a series of die stations by way of a semi-circular path between each die station and wherein the blanks are inverted between certain die stations and are not inverted in their travel between certain other die stations. Further objects and advantages will appear from the following description and the appended drawings wherein, Fig. 1 is a perspective view of a nut forming machine provided with a transfer mechanism according to the present invention.

2

Fig. 2 is a diagrammatic plan view of the transfer mechanism showing the paths through which the blanks travel.

Fig. 3 shows a modified form of transfer mechanism embodying the present invention.

Fig. 4 is an elevation with parts in section showing the mounting for a pair of transfer fingers.

Fig. 5 is a plan view of the transfer mechanism, and

Fig. 6 is an elevation of the transfer mechanism.

Referring to the drawings, the transfer mechanism is illustrated in the environment of a nut forming machine having a bed frame 5 and a reciprocating header slide 6. The bed frame is provided with die stations 7, 8, 9, 10 and 11, and the header slide is provided with complementary tools 7a, 8a, 9a, 10a, and 11a. Wire or rod stock fed into the machine is cut into lengths providing the required volume of metal by shear 12 which moves the cut blank up into alignment with the die 7 and is moved into die 7 by header slide tool 7a. Thereafter the blank is ejected from die 7 into the first pair of transfer fingers 13—14 and is sequentially worked in dies 8, 9, 10 and 11. The last die in the series is preferably a trim die and the finished nut blank is pushed through said die 11 into a chute or the like formed in the bed frame.

The transfer mechanism includes the actuator shafts 15, 16, 17 and 18 pivotally mounted with respect to the bed frame midway between the dies 7 to 11 respectively. Each actuator shaft has fixed thereto transfer arms 15a, 16a, 17a and 18a and the arms are proportioned with respect to the die spacing so that the free end of the arm is in alignment vertically with an adjacent die station. The arms 15a—18a are arranged to be oscillated in unison 180 degrees so as to swing from a position in vertical alignment with one die to a position in alignment with the next adjacent die. For instance, the arm 15a is in its left hand position shown in Fig. 1 where it is in vertical alignment with die 7. When the arm is oscillated 180 degrees, it will be in its right position in alignment with die 8. To oscillate the arms 15a—18a a rack 19 in mesh with gears 15b—18b is reciprocated by link 20 and oscillating bellcrank 21. Through rack and pinion 22 and 23 respectively, the rack 19 is oscillated in timed relation to the header slide movement so that upon each advance of the header slide toward the bed frame dies the arms 15a—18a are in their right hand positions. As the header slide recedes from the bed frame dies the arms 15a—18a are moved to the position shown in Fig. 1. Fig. 2 illustrates diagrammatically the position of the arms 15a—18a at the mid point of their travel from the left hand to right hand positions.

The arms 15a, 16a and 18a are shown as provided with depending transfer fingers 13—14, 24—25, and 28—29 respectively. The fingers are spring pressed toward each other so that blanks ejected from the dies 7, 8 and 10 will be resiliently held during the transfer to the next adjacent die. The said fingers 13—14, 24—25, and 28—29 are carried by block members 15c, 16c, and 18c fixed to arms 15a, 16a, and 18a respectively. Since the arms 15a, 16a and 18a each turn 180 degrees in moving from their left hand position to their right hand positions, the blanks carried by the transfer fingers are likewise turned 180 degrees. For instance, the tool 8a will engage one end of the blank in die 8 and the tool 9a will engage the other end of the same blank in die 9. When, however, the nut forming process requires that tool 10a engage the same end of a blank in die 10 that was worked by tool 9a in die 9, the blank should be transferred from die 9 to die 10 without turning the blank.

To provide for the non-turning of the blank during transfer from die 9 to die 10, the free end of arm 17a is provided with a bearing clamp 17d for the bearing 17e. The fingers 26 and 27 are carried by the member 17c which is rotatable in bearing 17e. The bearing 17e is adjustable vertically with respect to arm 17a by means of the threaded connection as shown and may be adjusted angularly by means of the set screws 17f and 17g. Transversely of the lower end of member 17c, a flat leaf spring 17h is secured as at 17i. The free ends of the leaf spring 17h are formed with reentrant portions which embrace the portions 16c and 18c of the adjacent transfers. The above described arrangement results in a parallel linkage control for the transfer fingers 26 and 27 which precludes their turning with respect to the die breast. Thus a blank carried by fingers 26 and 27 will not be inverted as it is moved from die 9 to die 10.

It will be understood that any number of transfer units of the type such as 17c may be used depending on the requirements of the forming process employed and the article being shaped. I have illustrated the transfer of the non-turning type in connection with the 3d and 4th die stations but it is well suited for use at other die stations. Mechanism other than the leaf spring 17h may be employed to prevent the end-for-end turning of the blank during transfer. For instance the modification of Fig. 3 may be used.

In Fig. 3 adjacent die stations are indicated at 30 and 31. The transfer arm 32 is oscillated between the two die stations by rack means such as described in connection with the preferred embodiment. The gear 34 is non-rotatably secured to the bed frame and with respect to the oscillating arm 32. The arm 32 carries with it an idler gear 35 in mesh with the fixed gear 34 and a gear 36 keyed to the transfer finger shaft 37. The gears 34, 35 and 36 being of the same size and having the same number of teeth results in the transfer fingers remaining parallel to the die breast. The swinging of the arm from die 30 towards die 31 produces a counter-clockwise rotation of the idler gear 35. The rotation of the idler gear in a counter-clockwise direction produces a clockwise rotation of the transfer finger shaft 37 with respect to the arm carrying same. Thus the 180 degree swing of the arm 32 in the direction of arrows 38 is balanced by 180 degrees of rotation of the transfer finger shaft 37 in an opposite direction so that the blank carried by the fingers maintains a constant axial disposition during the transfer.

Although I have described one form of my invention and a modification thereof in considerable detail, numerous variations may be made therein without departing from the scope of the invention as defined in the following claims.

I claim:

1. A transfer for progressively moving a metal blank through a series of parallel coplanar die stations comprising a plurality of parallel spindles mounted for rotation around an axis in a plane normal to the plane containing the axes of the said die stations, a transfer arm fixed to each spindle at right angles with respect to the rotational axis of the spindle, means to simultaneously oscillate said spindles through 180 degrees, a pair of cooperating transfer fingers mounted on each of said arms parallel to the axis of rotation of said spindle, at least one pair of said fingers being pivotally secured to its arm on an axis parallel to the oscillating axis of the spindle, at least another pair of said fingers being non-rotatably fixed to its arm, and means to turn said pivotally secured fingers with respect to its arm as the arm is oscillated by the spindle.

2. A transfer for moving blanks through a series of parallel coplanar die stations comprising a series of parallel coplanar oscillatable actuators pivotally mounted between the die stations on axes normal to the plane containing the axes of the dies, means to oscillate the actuators, a transfer arm on each actuator proportioned with respect to the spacing of the die stations so that the free end of the arm swings from one die station to the next adjacent station as the actuator is oscillated, a pair of cooperating transfer fingers secured to said free end of each arm, at least one pair of said fingers being pivotally mounted on the arm on an axis parallel to the actuator axis, at least another pair of said fingers being non-rotatably fixed to its arm, means secured to said pivotally mounted fingers engaged by an adjacent pair of fingers whereby said pivotally mounted fingers are turned with respect to its arm as the actuators are oscillated.

3. A transfer comprising a plurality of parallel coplanar pivotally mounted actuators, means to oscillate the actuators in unison through 180 degrees, a transfer arm fixed to each actuator, a depending transfer member secured to each arm, at least one of said members being pivotally secured to its arm on an axis parallel to the axis of oscillation of the actuators, at least another of said members being non-rotatably fixed to its arm and means connecting said pivotally secured member to said non-rotatably fixed member whereby said pivotally secured member is turned on its pivotal axis with respect to its arm as the said arms are oscillated.

4. A transfer comprising a plurality of parallel coplaner pivotally mounted actuator means, operating means to operate said actuator means in unison around their pivots, each actuator means including a transfer arm having a portion spaced from its pivot, a transfer member secured to said portion of each transfer arm, at least one of said members being pivotally secured to its arm, at least another of said members being non-rotatably fixed to its arm, and member operating means preventing said pivotally secured member from rotating with its arm when its arm is rotated by said operating means.

5. A transfer comprising a plurality of parallel coplaner pivotally mounted actuator means, operating means to operate said actuator means in unison around their pivots, each actuator means including a transfer arm having a portion spaced from its pivot, a transfer member secured to said portion of each transfer arm, at least one of said members being pivotally secured to its arm, at least another of said members being non-rotatably fixed to its arm, and an operating arm mounted on said pivotally secured member engaging an adjacent member preventing said pivotally secured member from rotating with its arm when its arm is rotated by said operating means.

6. A transfer comprising a plurality of parallel coplaner pivotally mounted actuator means, operating means to operate said actuator means in unison around their pivots, each actuator means including a transfer arm having a portion spaced from its pivot, a transfer member secured to said portion of each transfer arm, at least one of said members being pivotally secured to its arm, at least another of said members being non-rotatably fixed to its arm, and member operating gears preventing said pivotally secured member from rotating with its arm when its arm is rotated by said operating means.

References Cited in the file of this patent

UNITED STATES PATENTS

| Number | Name | Date |
|---|---|---|
| 398,664 | Sleeper | Feb. 26, 1889 |
| 1,982,460 | Wilcox | Nov. 27, 1934 |
| 2,100,028 | Frayer | Nov. 23, 1937 |
| 2,128,186 | Jones | Aug. 23, 1938 |